Jan. 14, 1930.  C. WAINWRIGHT  1,743,989
HEAT EXCHANGER
Filed Jan. 30, 1928
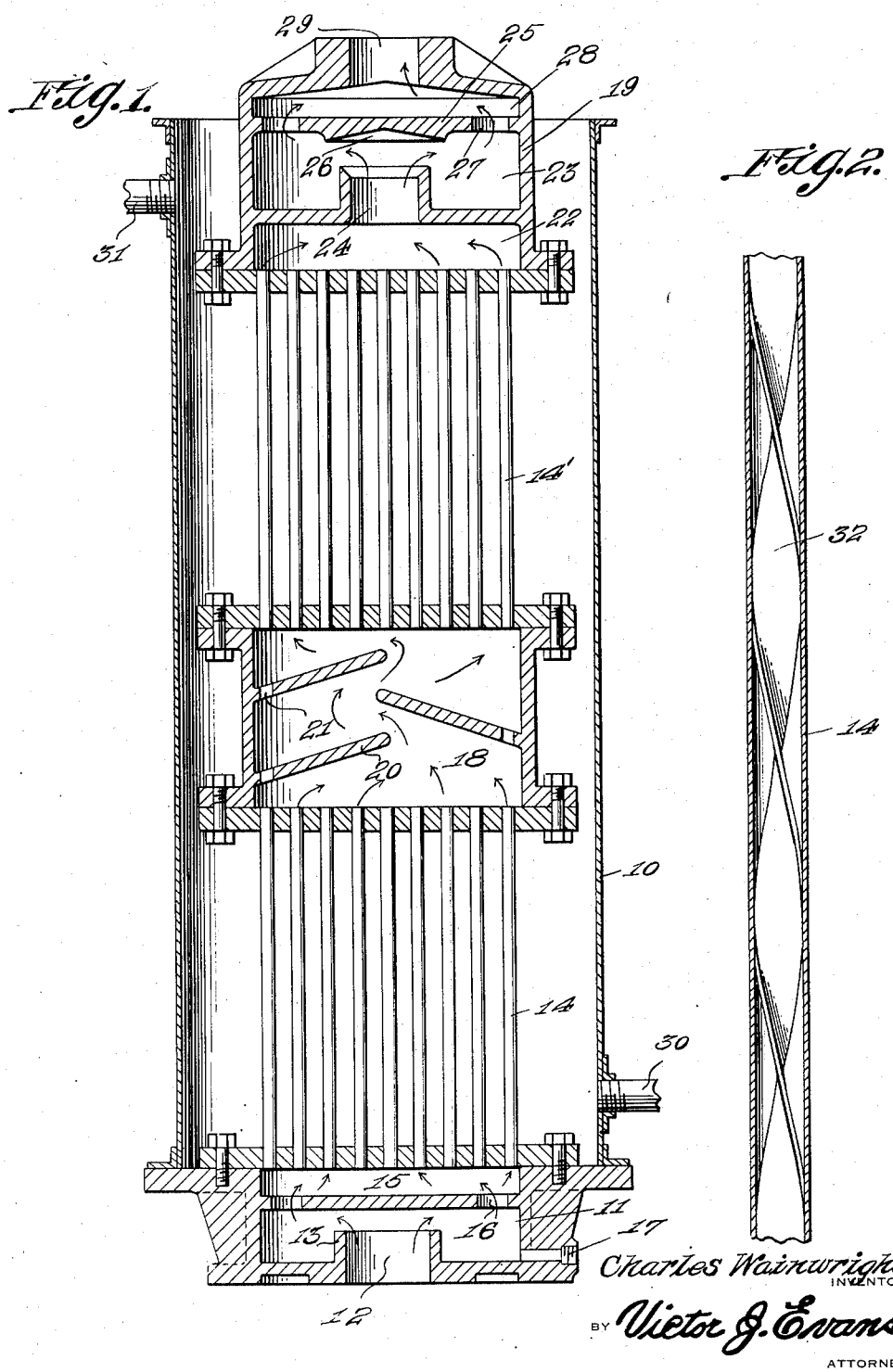
Charles Wainwright, INVENTOR
BY Victor J. Evans, ATTORNEY Patented Jan. 14, 1930

1,743,989

UNITED STATES PATENT OFFICE

CHARLES WAINWRIGHT, OF ERIE, PENNSYLVANIA

HEAT EXCHANGER

Application filed January 30, 1928. Serial No. 250,519.

This invention relates to improvements in heat exchangers, an object being to provide an exchanger which may be used as an intercooler, an aftercooler, or a feed water heater of either open or closed type.

Another object of the invention is the provision of a heat exchanger having air or gas tubes or passages provided with means to direct the air or gas to the walls of said passages, the character of the means employed for this purpose also serving as a means for cleaning the tubes or passages.

Another object of the invention is the provision of a mixing chamber which is located in the path of fluid passing through the tubes or passages, and which is provided with baffles arranged for mixing, baffling and handling the condensate.

With the above and other objects in view, the invention further includes the following novel features and details of construction, to be hereinafter more fully described, illustrated in the accompanying drawing and pointed out in the appended claims.

In the drawing:—

Figure 1 is a central vertical sectional view through a heat exchanger embodying the invention.

Figure 2 is an enlarged longitudinal sectional view through a portion of one of the tubes with the removable deflector shown in elevation.

Referring to the drawing in detail wherein like characters of reference denote corresponding parts, the reference character 10 indicates a casing which may be open at the top as shown and whose bottom is provided with a chamber 11. The bottom wall of the chamber 11 is provided with an inlet opening 12 for the passage of suitable fluid, such as air or gas, and this opening is surrounded by a flange 13 which extends into the chamber 11. The top of the chamber 11 has extending therefrom a plurality of tubes 14 which provide passages for the fluid passing through the chamber 11, the lower ends of these tubes being in communication with this chamber. Located within the chamber 11 between the inlet opening 12 and the ends of the tubes 14 is a diaphragm or plate 15 having openings 16 therein. The openings 16 are so disposed with respect to the opening 12 that the fluid entering the chamber 11 will be deflected radially so as to pass through the openings 16 to enter the tubes 14, the condensate settling in the chamber 11 and passing outward through a drain 17. This drain may be connected to a suitable trap (not shown).

The upper ends of the tubes 14 communicate with a mixing chamber 18, while additional tubes 14' also communicate with this chamber and with an outlet member 19. The mixing chamber 18 is provided with oppositely inclined baffle plates 20 having openings 21 therein, so that these baffle plates are arranged in the path of fluid passing through the tubes.

The upper ends of the tubes 14' communicate with a lower chamber 22 provided in the outlet member 19 and this chamber communicates with an intermediate chamber 23 through a passage 24. The outlet end of the passage 24 is arranged adjacent the baffle plate 25 which is provided in the outlet member and this baffle plate is provided with a depression 26. The depression 26 is located directly above the passage 24 and is formed with inclined walls so that fluid passing through the passage 24 into the intermediate chamber 23 will be deflected radially and will pass through openings 27 provided in the baffle plate 25 into an outlet chamber 28. The chamber 28 is provided with an outlet passage 29.

The casing 10 is provided with a water or other inlet 30 near its bottom and with an outlet 31 near its top.

In order to direct fluid passing through the tubes 14 to the inner walls of the tubes and thus obtain maximum efficiency, the tubes have located therein deflecting elements 32. These elements are of spiral formation and are movable longitudinally within the tubes, so that in addition to providing a swirling action for the fluid passing through the tubes, also act as scrapers or cleaners for the inner walls of the tubes when the elements 32 are moved longitudinally therein.

The invention is susceptible of various changes in its form, proportions and minor details of construction and the right is herein reserved to make such changes as properly fall within the scope of the appended claims.

Having described the invention what is claimed is:

1. In a multi-stage heat exchanger, spaced cooling units, and a mixing chamber located between said units to receive and mix the air during its passage from one unit to the other.

2. In a multi-stage heat exchanger, spaced cooling units including a plurality of separate air conduits, and a mixing chamber located between said units and communicating with the conduits to mix the air during its passage from the conduits of one unit to the conduits of another unit.

In testimony whereof I affix my signature.

CHARLES WAINWRIGHT.